United States Patent [19]

Yang

[11] Patent Number: 5,410,231
[45] Date of Patent: Apr. 25, 1995

[54] AUXILIARY POWER SUPPLY CIRCUIT FOR A SERIES MOTOR

[76] Inventor: Tai-Her Yang, 5-1 Taipin St., Si-Hu Town, Dzan-Hwa, Taiwan, Prov. of China

[21] Appl. No.: 87,268

[22] Filed: Jul. 8, 1993

[51] Int. Cl.⁶ .............................................. H02P 7/18
[52] U.S. Cl. ................... 318/529; 318/530; 318/248
[58] Field of Search ............... 318/244, 245, 246, 248, 318/251, 493, 521, 523, 526, 527, 529, 530

[56] References Cited

U.S. PATENT DOCUMENTS

| | | |
|---|---|---|
| 3,604,537 | 9/1971 | Holuba . |
| 3,628,621 | 12/1971 | Lee . |
| 3,858,674 | 1/1975 | Tabor . |
| 3,936,709 | 2/1976 | Wright . |
| 4,107,586 | 8/1978 | Buchwald et al. . |
| 4,551,659 | 11/1985 | Markham . |
| 4,751,439 | 6/1988 | Buchwald et al. . |
| 5,165,006 | 11/1992 | Nagano et al. . |

*Primary Examiner*—Bentsu Ro
*Attorney, Agent, or Firm*—Bacon & Thomas

[57] ABSTRACT

A compound series motor includes a series field winding, armature, and auxiliary power supply connected in parallel with the series winding. The drop in armature current through the series field winding may be reduced by connecting an auxiliary field winding having the same polarity as the series field winding between the auxiliary power supply and the main power supply connection to the series field winding so as to prevent an excessive rise in running speed during idle load conditions, while a diode may be connected between the auxiliary power supply and the series field winding connection to the armature to prevent armature current losses. The power supply can be operated to supply continuous excitation current to the series field winding, or be controlled relative to the input voltage, the loading current value, or both the voltage and loading current values to provide an assist-type supplemental excitation current to the series field winding.

2 Claims, 1 Drawing Sheet

AUXILIARY POWER SUPPLY CIRCUIT FOR A SERIES MOTOR

SUMMARY OF THE INVENTION

During compound voltage driving of a series motor, a speed change can be effected by changing the torque in combination with the load. However, during low voltage driving or light loading, when the armature current is too small the field will become relatively weak, reducing the torque and resulting in a poor rate of speed adjustment and low efficiency. The present solves this problem by providing an independent power supply for use when the motor is in a low voltage driving or lightly-loaded state, and by employing the series winding as the load for the auxiliary power supply in order to improve efficiency during low voltage and low speed driving.

DETAILED DESCRIPTION OF THE PREFERRED EMBODIMENTS

The conventional series motor is widely used in manufacturing industries due to its great starting torque and small impact on the power supply. Nevertheless, it has a low efficiency during low voltage driving or light-loading operation. Recently, owing to the development of solid-state electronic techniques, speed controls for series motors have become common. However, the defect of extra-low efficiency during low voltage driving is not improved at all by such solid-state speed controls. Especially during low voltage driving, since the excitation current for the series field is equivalent to the armature current, when the armature current is too small the field will become relatively weak, reducing the torque so that the rate of speed adjustment is extremely poor. The present invention compensates for this effect by providing a compound voltage motor which has an auxiliary excitation power supply which by-passes the series field winding in order to intensify the excitation current of the series winding and improve its operational efficiency.

Figure 1:
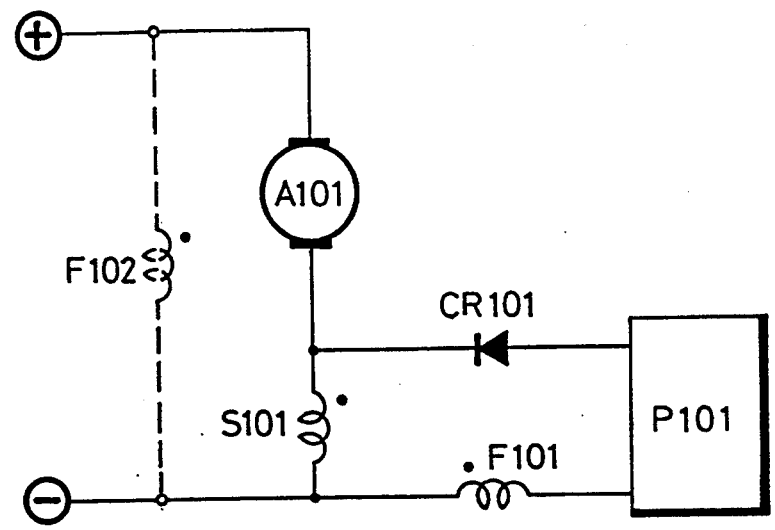
FIG. 1 is a functional block diagram of a preferred compound voltage driven series motor having an assisted field winding excitation.

Referring to FIG. 1, a preferred compound voltage driven series motor having assisted field excitation includes a series field winding S101 connected in series with armature A101 and a shunt field winding F102 connected in parallel with ⊕ and ⊖ terminals of the main power supply.

The preferred motor also includes an auxiliary power supply P101 made up of a storage type electrical element, generator set, or other electrical device capable of supplying an excitation current to the series field winding via diode CR101 in order to increase torque and improve the rate of motor speed adjustment. In addition to series diode CR101 connected between power supply P101 and the series field winding S101, an additional field winding F102 having the same excitation polarity as the series field winding may be included to reduce armature current losses in the series field winding and maintain a more stable field under the same excitation intensity condition so as to prevent an excessive rise in running speed during an idle load condition.

Figure 2:
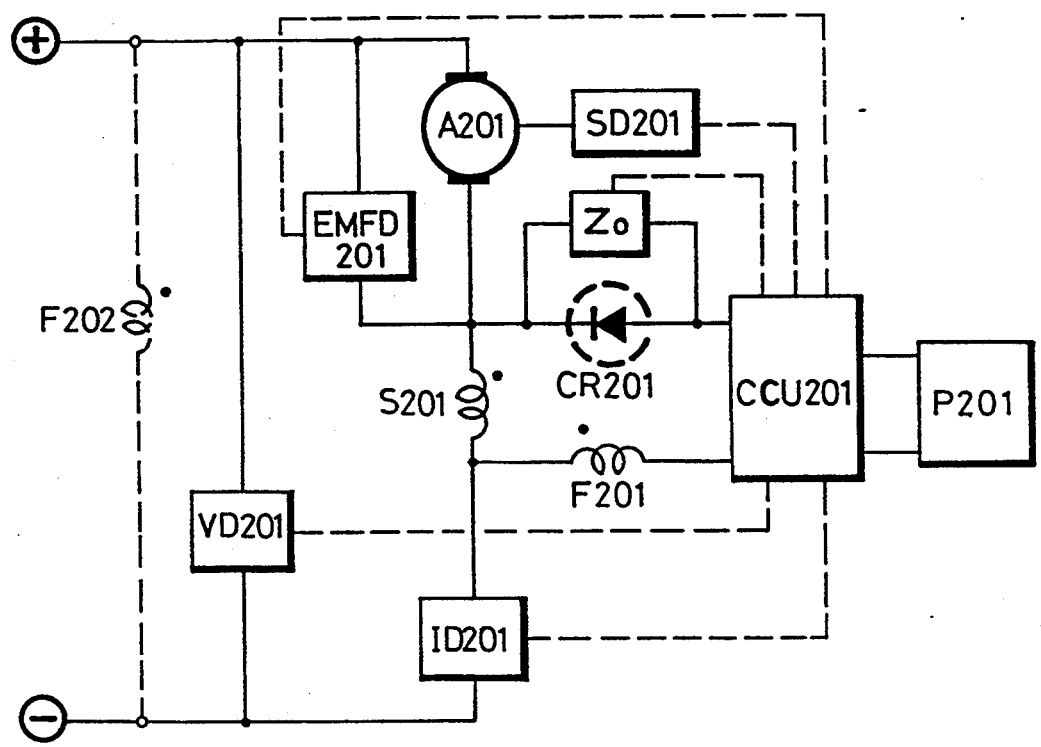
FIG. 2 is a schematic circuit diagram showing an embodiment of the preferred series motor including sensor elements and a control unit.

FIG. 2 shows an especially advantageous embodiment of the preferred compound voltage driven series motor which provides:

(1) continuous excitation;
(2) control of the excitation current value relative to the input voltage;
(3) control of the excitation current value relative to the loading current value; and
(4) control of the excitation current value relative to both input voltage and loading current value.

The embodiment of FIG. 2 includes an assisted field excitation winding, sensor elements, and a control unit in which a supplemental excitation current value is determined subject to motor speed, armature counter EMF potential, or current changes in the supplemental excitation power supply relative to the series field, input current, or input voltage value. The DC series motor to which the supplemental or assist current is supplied is made up of a series field winding S201 series and an armature A201. In addition, an auxiliary field winding F201 having the same polarity as series field winding S201 is series connected between the series field winding and a supplemental excitation power supply P201 so that the motor armature current is not allowed to pass through the assisted field winding. Power supply P201 includes a storage type electrical element or generator set or other electrical device, with the series field winding S201 and auxiliary field winding F201 connected in series with a central control unit CCU201, the central control unit being connected to a voltage detector VD201 connected across the main power supply input, a loading current sensing device ID201, a motor speed sensing device SD201, or an armature counter EMF sensing device EMFD201, for controlling the output of power supply P201 to the series field winding in response to changes in the voltage across the series field winding which in turn result from changes in the loading current, so that when an increase in loading current leads to an increase in the voltage drop across the series field winding, the current supplied by auxiliary power supply P201 is decreased.

For the situation when this voltage drop value is greater than the voltage of the auxiliary power supply, and the auxiliary power supply is made up of a storage type element such as battery, further adjustments may be made using a current-limiting adjustment Zo connected in parallel between two ends of the choke diode CR201, so as to further adjust the current charged to storage type element P201, depending upon the signal input to central control unit.

The embodiments above are provided to verify the reasonableness and utility of the fundamental principles embodied in the circuit shown in FIG. 1. In accordance with applicable laws, however, the invention should not be limited to any particular embodiment, but solely in accordance with the appended claims.

I claim:

1. A series motor control circuit, comprising:
   a main power supply connected to supply power to the motor armature through a series field winding having a first end connected to the power supply and a second end connected to the armature;
   an auxiliary power supply connected in parallel to the series field winding;
   means including an auxiliary field winding having one end connected to the auxiliary power supply, and a second end connected to said first end of the series field winding for reducing a voltage drop of the armature current across the series field winding in order to maintain a more stable field and prevent excessive rises in running speed during idle load conditions;

means including a series diode having one end connected to the auxiliary power supply, and a second end connected to said second end of the series field winding for allowing the auxiliary power supply to supply current to the armature in addition to that supplied from the main power supply; and means including a central control unit for activating said auxiliary power supply either:

(1) constantly;

(2) in response to detection of a change in input voltage from the main power supply;

(3) in response to change in loading current value; or (4) in response to changes in both said input voltage and said loading current value.

2. A circuit as claimed in claim 1, wherein the series diode is a choke diode, and the central control unit includes current limiting means for controlling the auxiliary power supply such that when the loading current increases, resulting in an increase in the voltage drop across the series field winding, an amount of current supplied by the auxiliary power supply to the series field winding is decreased, the current limiting means including means for controlling a current-limited adjustment element connected between two ends of the choke diode to cause said decrease in current.

* * * * *